UNITED STATES PATENT OFFICE.

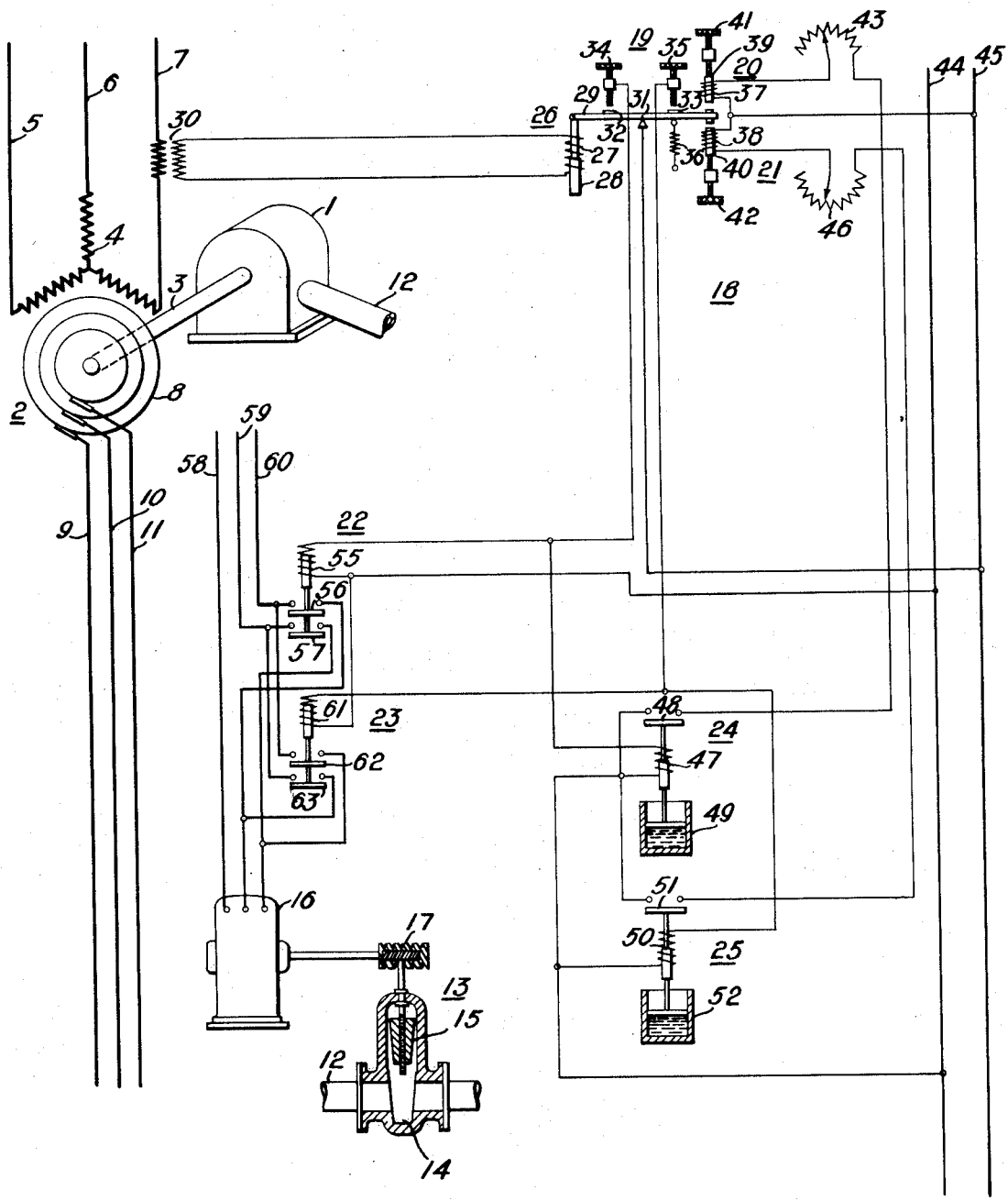

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

ANTIHUNTING REGULATOR SYSTEM.

1,419,422.  Specification of Letters Patent.  Patented June 13, 1922.

Application filed April 18, 1919. Serial No. 291,083.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Antihunting Regulator Systems, of which the following is a specification.

My invention relates to regulator systems and particularly to anti-hunting devices for regulator systems.

One object of my invention is to provide a regulator with a relatively simple and inexpensive electromagnetic device for preventing the so-called "hunting action" by the regulator.

Another object of my invention is to provide an anti-hunting device that shall produce an electromagnetic force of predetermined value for opposing the initial operation of the regulator at a predetermined time and thus effect a balancing of the regulator parts before the time when the motor, being regulated, reaches its normal speed.

In order to clearly illustrate my invention, the regulator and the anti-hunting device associated with it have been shown connected to a pulp-grinder motor. In the system disclosed in this application, the load on the motor is maintained constant by a regulator which is preferably governed in accordance with the current supplied to the motor. It is clearly apparent, however, that, if so desired, the regulator system may be controlled in accordance with either the voltage or the power supplied to the motor for maintaining either the speed of, or the load on, the motor substantially constant.

In many regulator systems now in service, which serve to govern the speed of, or the load on, a motor, there is a distinct tendency or disposition of the moving parts of the system to overtravel and produce the so-called "hunting action." In brief, trouble is experienced in obtaining a regulator which will obtain a state of equilibrium in one or very few movements of the main control parts; the tendency being to compensate the motor above or below the normal operating condition by reason of the inertia of the moving parts of the regulator.

In a regulator system constructed in accordance with my invention, the initial movement of the main control parts is opposed, at a predetermined time, by an opposing force which returns the various parts of the regulator to normal position at a time just previous to operating the motor under normal conditions, so that the inertia of the various moving parts of the regulator system will not over-compensate the motor.

The system for operating a pulp grinder, which is utilized for describing my invention, is provided with a main motor, preferably an induction motor, and is supplied, by a hydraulic-pressure system, with wood or other suitable material for grinding into pulp. The hydraulic-pressure system is provided with a motor-operated valve which is so governed by a regulator sytem as to maintain a substantially constant load on the pulp grinder. The regulator, which selectively governs the rotation of the auxiliary motor for operating the regulating valve of the hydraulic system, embodies a contact-making ammeter, which is operated in accordance with the current supplied to the pulp-grinder motor. The regulator further comprises two electromagnets for opposing the action of the ammeter, under predetermined conditions, to prevent a hunting action by the regulator, and two switches and two relays which are selectively operated by the ammeter for governing the operation of the auxiliary motor and for governing the operation of the two electromagnets.

The single figure of the accompanying drawing is a diagrammatic view of a regulator system embodying my invention.

Referring to the drawing, a pulp grinder 1 is operated by an induction motor 2 and is connected thereto in any suitable manner, as by means of a shaft 3. The induction motor 2 embodies a stator winding 4, which is connected to a supply-circuit embodying conductors 5, 6 and 7, and a rotor 8, the winding of which is connected, by conductors 9, 10 and 11, to any suitable controller (not shown).

A hydraulic-pressure system 12, having a regulator valve 13 connected thereto, is provided for supplying the pulp grinder 1 with wood or any other suitable fibrous material which is to be ground into pulp. The regulating valve 13, which may be of any suitable well known type, is illustrated as comprising a seat 14 and a gate 15 which may be suitably connected to an auxiliary motor 16, as by means of worm gearing 17. The motor 16 is adapted to be selectively operated in a clockwise or in a counter-clockwise direction by a regulator 18 for controlling the lowering or the raising of the gate 15.

The regulator 18 embodies a contact-making ammeter 19, which is operated in accordance with the current supplied to the main induction motor 2, two electromagnets 20 and 21, which oppose the action of the contact-making ammeter, under predetermined conditions, in order to prevent a hunting action by the regulator, two switches 22 and 23, which are selectively operated by the ammeter for governing the direction of rotation of the auxiliary motor 16, and two relatively slow-acting relays 24 and 25, which are selectively operated by the ammeter for governing the operation of the two electromagnets 20 and 21.

The contact-making ammeter 19 embodies a main control magnet 26 having a winding 27 and a core armature 28 which is pivotally connected to a contact arm 29. The winding 27 is connected to the supply conductor 7 by means of a transformer 30 in order that the main control magnet 26 may be operated in accordance with the current supplied to the induction motor 2. The contact arm 29, which is pivotally mounted at 31, is provided with two main contact terminals 32 and 33 which are respectively adapted to engage two adjustable main contact terminals 34 and 35 in the extreme positions of the contact arm. An adjustable spring 36 is connected to the contact arm for counterbalancing the weight of the core armature 28.

The two electromagnets 20 and 21, which are located on opposite sides of the contact arm 26, respectively embody windings 37 and 38 and core armatures 39 and 40 which are respectively adjusted by means of the thumb-screws 41 and 42. The winding 37 is adapted to be connected, through an adjustable resistor 43, across an auxiliary supply circuit comprising conductors 44 and 45 by means of the relay 24. The winding 38 is adapted to be connected, through an adjustable resistor 46, across the supply conductors 44 and 45 by means of the relay 25. The thumb-screws 41 and 42 and the adjustable resistors 43 and 46 serve to control the strength of the electromagnets 20 and 21 and, accordingly, their effect upon the contact arm 29 of the contact-making ammeter 19.

The relay 24 embodies a switch member 48 and a winding 47, which is connected across the supply conductors 44 and 45 by means of the engagement of the main contact terminals 32 and 34. An adjustable dash-pot 49 is connected to the relay armature and the switch member 48 for regulating the speed of operation of the relay. The relay 25 embodies a switch member 51 and a winding 50, which is connected across the supply conductors 44 and 45 by means of the engagement of the main contact terminals 33 and 35. The speed of operation of the relay 25 is regulated by means of an adjustable dash-pot 52.

The switch 22 embodies a winding 55, which is connected across the supply conductors 44 and 45 by means of the main contact terminals 32 and 34, and two switch members 56 and 57, which connect the auxiliary motor 16 to an auxiliary supply circuit 36 comprising conductors 58, 59 and 60, for effecting rotation of the motor in a clockwise direction to close the valve 13. The switch 23 embodies a winding 61, which is connected across the auxiliary supply conductors 44 and 45 by means of the main contact terminals 33 and 35, and two switch members 62 and 63. The two switch members 62 and 63 connect the motor 16 to the supply circuit comprising conductors 58, 59 and 60 for rotating the motor in a counter-clockwise direction in order to effect the opening of the valve 13.

Assuming the apparatus of the system to be in the position illustrated and an overload to be applied to the pulp grinder 1, then an increased current will be drawn by the induction motor 2 for operating the pulp grinder. Accordingly, an increased current will be supplied by the transformer 30 to the main contact electromagnet 26 for operating the contact-making ammeter 19 to close the pair of contact terminals 32 and 34. Upon engagement of the pair of contact terminals 32 and 34, a circuit is completed from the supply conductor 45 through the contact terminals 32 and 34 and the windings 55 and 47 in parallel to the supply conductor 44. The switch 22 is operated to connect the motor 16 to the supply conductors 58, 59 and 60 for rotating it in a clockwise direction in order to effect the closing of the hydraulic valve 13. The closing of the valve 13 reduces the hydraulic pressure, which is utilized for supplying wood to the pulp grinder 1. Upon reduction of the load on the pulp grinder 1, the current drawn by the induction motor 2 is reduced to release the main control magnet 26 of the contact-making ammeter 29 and thus release the switch 22 to stop the operation of the auxiliary motor 16. However, before any such release of the contact-making ammeter can be effected by a reduction of the current in the supply conductor 7, the relatively slow-acting relay 24 is operated to connect the winding 37 of the electromagnet 20 across the supply conductors 44 and 45. The electromagnet 20, when energized, opposes the action of the main control electromagnet 26 and effects a separation of the main contact terminals 32 and 34. It should be noted that the electromagnet 20 is operated to separate the contact terminals 32 and 34 at a time that will prevent overtravel of the motor 16 and the valve 13 and such as would reduce the load on the pulp grinder below normal value.

In case the load upon the pulp grinder 1 is reduced below normal value, then the current drawn by the motor 2 is reduced. Thereupon, the current supplied by the transformer 30 to the winding 27 of the main control magnet 36 is reduced below normal value and, accordingly, the strength of the magnet 26 is reduced to such point as to permit the engagement of the contact terminals 33 and 35. Upon engagement of the contact terminals 33 and 35, a circuit is completed from the supply conductor 45 through the contact terminals 33 and 35 and the windings 61 and 50, in parallel, to the supply conductor 44. Thereupon, the switch 23 is operated to connect the auxiliary motor 16 to the supply conductors 58, 59 and 60 for rotation in a counter-clockwise direction and a consequent opening of the hydraulic valve 13. The opening of the hydraulic valve 13, as has been heretofore set forth, effects an increase in the load upon the pulp grinder 1 and the induction motor 2.

Previously to the applying of full load to the pulp grinder, the relay 25 is operated to energize the electromagnet 21. Upon energization of the electromagnet 21, the contact-making ammeter 19 is operated thereby in a manner to effect the separation of the contact terminals 33 and 35. Thereupon, the switch 23 is open to stop the operation of the motor 16 and the consequent opening of the valve 13.

It will be noted that the electromagnets 20 and 21 are operated by the relays 24 and 25 to prevent overtravel by the auxiliary motor 16 and the hydraulic valve 13; in case the pulp grinder is operating either with an overload or with an underload thereon. In case the first operation of the contact-making ammeter does not raise or lower the load on the pulp grinder to normal value, then a second or third operation thereof may be necessary, according to the setting of the dash-pots 49 and 52 of the relays 24 and 25.

Modifications in the system and arrangement and location of parts may be made within the spirit and scope of my invention and such modifications are intended to be covered by the appended claims.

I claim as my invention:

1. In a regulator, a contact-making instrument, two electromagnets operated at predetermined times for opposing the action of said instrument, and means, comprising two slow-acting relays controlled by the contact-making instrument, for selectively operating said electromagnets to prevent hunting action by the regulator.

2. In a regulator, a contact-making ammeter, a plurality of switches selectively operated by said ammeter, a plurality of electromagnets for opposing the action of said ammeter under predetermined conditions, and a plurality of relays controlled by said ammeter for selectively operating said electromagnets, said electromagnets, when energized, overcoming said ammeter after variable time intervals.

3. In a regulator, a contact-making instrument having main contact terminals, two electromagnets for opposing the action of said instrument, under predetermined conditions, means, comprising relays controlled by said main contact terminals, for selectively operating said electromagnets, and means for adjusting the opposing force of said electromagnets to overcome the ammeter after different time intervals to prevent a hunting action by the regulator.

4. In a regulator, a contact-making instrument having a contact arm, a main control magnet for operating the contact arm, and two pairs of main contact terminals respectively closed in the extreme positions of the contact arm, two electromagnets respectively located on opposite sides of the contact arm for opposing the action of the main control magnet, and means, comprising two slow-acting relays respectively controlled by said pairs of main contact terminals, for selectively operating said electromagnets to prevent a hunting action by the regulator.

5. In a regulator system, the combination with a main motor, a pulp grinder connected to the main motor, an auxiliary motor, and means controlled by the auxiliary motor for maintaining a constant load on the pulp grinder, of a contact-making ammeter, means controlled by the ammeter for varying the operation of the auxiliary motor in accordance with the load on the main motor, means comprising two electromagnets for opposing the action of said ammeter, and means for adjusting said electromagnets to overcome the ammeter after different time intervals to prevent hunting action.

6. In a regulator system, the combination with a main motor, a pulp grinder connected to the main motor, and an auxiliary motor for varying the load on the pulp grinder, of a contact-making instrument, means controlled by said instrument for varying the operation of the auxiliary motor to maintain a substantially constant load on the main motor, means comprising two electromagnets for opposing the action of said instrument, and means for adjusting said electromagnets to overcome the instrument after different time intervals to prevent hunting action.

7. In combination, a main motor, a pulp grinder connected to the main motor, an auxiliary motor, means controlled in accordance with the direction of rotation of the auxiliary motor for varying the load on the pulp grinder, means comprising a contact-making ammeter for varying the direction of rotation of the auxiliary motor in accordance with the current supplied to the main motor, two slow-acting relays controlled by said ammeter, and two electromagnets controlled by said relays for opposing the operation of the ammeter to prevent hunting action.

8. In combination, a motor, a contact-making ammeter operated in accordance with the current supplied to the motor, means controlled by the ammeter for maintaining a substantially constant load on the motor, two slow-acting relays controlled by said ammeter, and two electromagnets controlled by said relays to prevent hunting action by the ammeter.

9. In combination, a main motor, an auxiliary motor, means controlled by the auxiliary motor for varying the load on the main motor, means, comprising a contact-making instrument, for governing the operation of the auxiliary motor to maintain a substantially constant load on the main motor, two slow-acting relays controlled by said instrument, and means comprising two electromagnets controlled by said relays for opposing the action of said instrument to prevent hunting action.

10. In combination, a main motor, and a contact-making ammeter governed in accordance with the current supplied to the main motor for maintaining a substantially constant load on the motor, and means comprising two relatively slow-acting relays controlled by the ammeter for preventing hunting action.

In testimony whereof, I have hereunto subscribed my name this 28th day of March, 1919.

STEPHEN A. STAEGE.